United States Patent [19]
Nicholson

[11] Patent Number: 5,274,953
[45] Date of Patent: Jan. 4, 1994

[54] PLANTING MACHINE SUITABLE SEEDLING TRAY

[75] Inventor: Scott Nicholson, Santa Maria, Calif.

[73] Assignee: Plantel Nurseries, Inc., Santa Barbara, Calif.

[21] Appl. No.: 917,183

[22] Filed: Jul. 22, 1992

[51] Int. Cl.⁵ .............................................. A01G 9/02
[52] U.S. Cl. ................................................. 47/87
[58] Field of Search ................ 47/86, 87; 108/24, 25; 206/386

[56] References Cited

U.S. PATENT DOCUMENTS

| | | |
|---|---|---|
| 4,144,672 | 3/1979 | Gradwell et al. |
| 4,197,674 | 4/1980 | Blackmore, Jr. |
| 4,242,834 | 1/1981 | Olsen ................... 47/86 |
| 4,769,946 | 9/1988 | de Groot et al. |
| 4,854,075 | 8/1989 | Greiling ................ 47/86 |
| 4,970,972 | 11/1990 | Williames |

FOREIGN PATENT DOCUMENTS

| | | | |
|---|---|---|---|
| 2318187 | 11/1974 | Fed. Rep. of Germany | 47/87 |
| 8500066 | 3/1986 | Netherlands | 47/39 |
| 482588 | 12/1969 | Switzerland | 108/25 |

Primary Examiner—Ramon S. Britts
Assistant Examiner—Joanne C. Downs
Attorney, Agent, or Firm—Marvin E. Jacobs

[57] ABSTRACT

A molded plastic seedling tray with an array of depressions thereon, with holes in the bottom of the depressions, each depression comprising a germination cell for growing plants. A perimeter side wall around the edge of the tray holds the germination cells up from the supporting surface so as to insure an air circulation chamber under the cells. Indexing holes are formed in the perimeter at intervals equal to the space between cells so that a planting machine can engage the holes and index the cells by one hole at a time, and thus one cell at a time. The indexing holes also provide root drying ventilation to enable self pruning.

2 Claims, 1 Drawing Sheet

PLANTING MACHINE SUITABLE SEEDLING TRAY

TECHNICAL FIELD

This invention relates to plastic seedling trays having a large array of germination cells within which plants can be grown from seeds until they are ready to be transplanted into a field. More particularly, a tray especially suitable to be used in an automatic planting machine is disclosed.

BACKGROUND OF THE INVENTION

It is known in the art to use plastic trays with a large number of molded depressions arrayed thereon. Each depression has a drainage hole in the bottom to form a germination cell. The cells are filled with a growth medium and seeds. The trays are stacked in a controlled environment germination chamber for a few days, then put in the greenhouse until the seedlings are ready for transplanting. For example, U.S. Pat. No. 4,769,946 to P. de Groot discloses such a tray. De Groot carefully limits the ventilation to the drainage hole area, by using small holes 42, so as to conserve moisture and encourage maximum germination. However, trays of this design allow the seedling roots to grow down through the drainage hole and spread outward, thus, locking the new and fragile plant into the germination cell.

Efficient farming techniques utilize seedling planting machines, such as shown in U.S. Pat. No. 4,970,972 to Williames. These machines typically eject the seedlings from the germination cells with a plunger that pushes up from the bottom of the tray so as to slide the plant, along with its surrounding growth medium, out of the tray and onto a suitable conveyor that carries the plant to the ground and plants it. If the plant has roots spreading out from the drainage hole that grasp the underside of the cell, substantial damage may be done to the seedling during this forcible ejection.

One prior art solution to this problem is disclosed in U.S. Pat. No. 4,144,672 to Gradwell et al. A tray using cells with break away bottoms is shown. This approach is expensive because the tray is destroyed after one use. Another solution is shown in U.S. Pat. No. 4,197,674 to Blackmore, which teaches cells having yieldable flap members in the bottom that bend out of the way of an ejection plunger. This method is also less than satisfactory because the flaps can clog with dirt, permanently distort after use, and still damage the roots of the seedlings that grow through the flap forming slits. The present invention avoids these problems with a tray designed to be especially suited to handling by machine.

SUMMARY OF THE INVENTION

Briefly, this invention discloses a seedling tray having a series of holes formed along the side. The holes are arranged so as to have one hole for each cell. The hole spacing is the same as the cell spacing. Two benefits are derived from this geometric constraint. First, ventilation to the area of the drainage holes is increased over prior art designs like de Groot by an order of magnitude or more. When exposed to this much ventilation, the seedling roots dry out and automatically self prune. Therefore, the problem of root locking is alleviated. Second, with the side holes spaced at the same intervals as the germination cells, the side holes may be used by the planting machine to advance the tray through the machine, one cell spacing at a time, without forcing a ratchet push member into the top of the cell itself, such as shown in FIG. 5 of the above referenced Williames patent. Depending on how the seedling has grown, this cell indexing ratchet may damage the fragile plant.

Additional benefits and advantages will become apparent upon consideration of the following detailed description and the drawings referenced thereby.

DETAILED DESCRIPTION OF THE INVENTION

Figure 1:
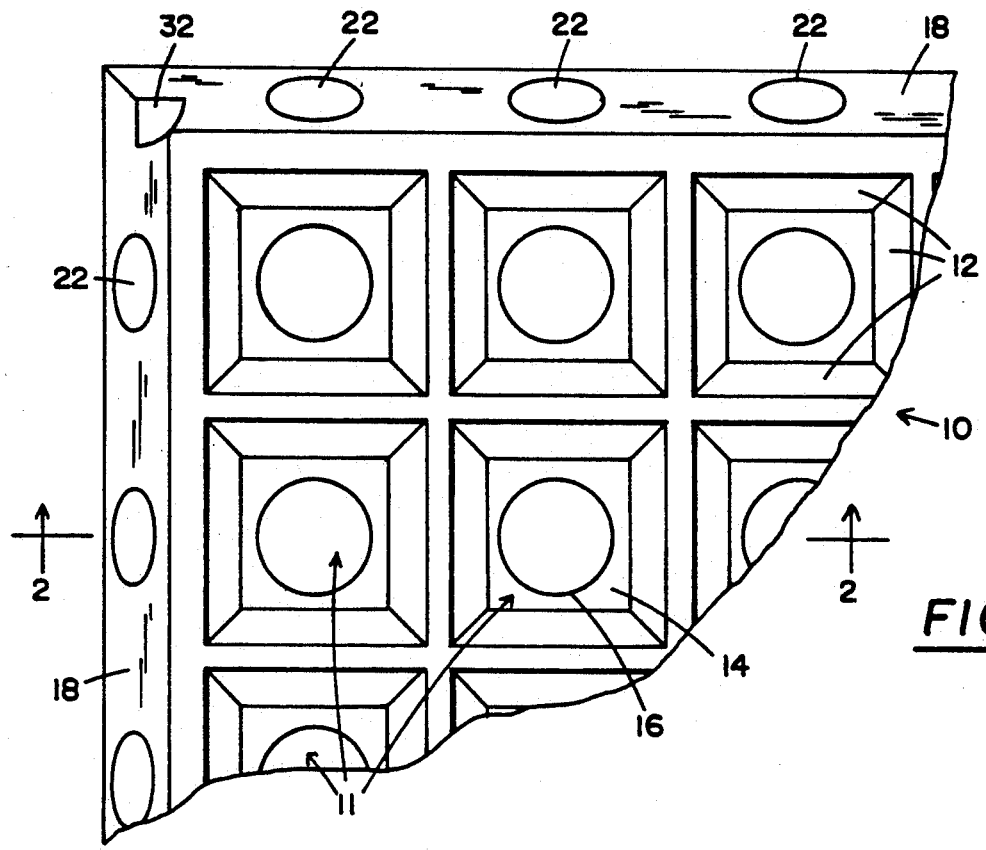
FIG. 1 is a fragmentary plan view of a corner portion of the seedling tray of the present invention.
Figure 2:
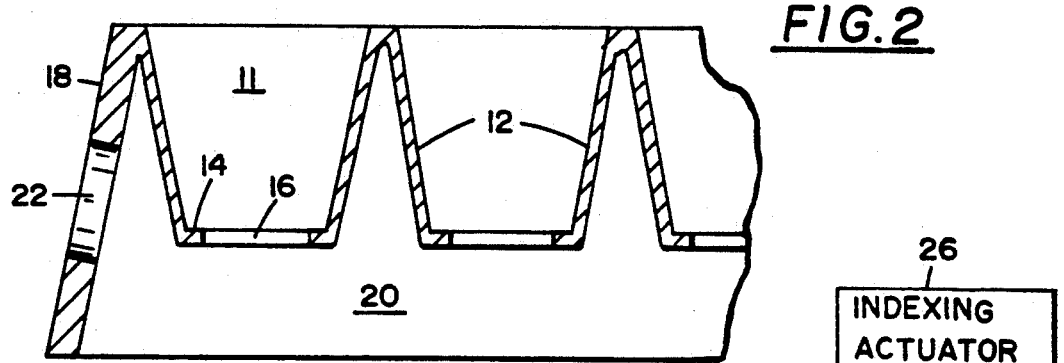
FIG. 2 is a sectional elevational view of the fragmentary portion of FIG. 1, taken on line 2—2 in FIG. 1.

Referring to FIGS. 1 and 2, a plastic seedling tray 10 is partially shown. The tray may have, for example, ten cells in one direction, and 30 cells in the other direction, for a total of 300 cells. However, only four complete cells are shown in FIG. 1. The tray is similar at the four corners.

Each cell 11 is formed from a molded depression comprising depending walls 12, a bottom 14, and a hole 16 in bottom 14. Tray 10 also has a skirt or side wall 18 around the perimeter of the tray. Side wall 18 slants outward, as shown in FIG. 2, so that the trays may be stacked in a nested fashion. The bottoms 14 of cells 11 are raised above the lower edge of side walls 18 by about three quarters of an inch to provide an air circulation chamber 20 when the tray is in use, resting on a substantially flat surface.

A series of holes 22 are formed in side walls 18. Holes 22 are spaced at intervals equal to the spacing from one cell 11 to the next cell 11. Thus, there will be one hole along each side wall 18 for each cell 11 along that side wall.

Figure 4:
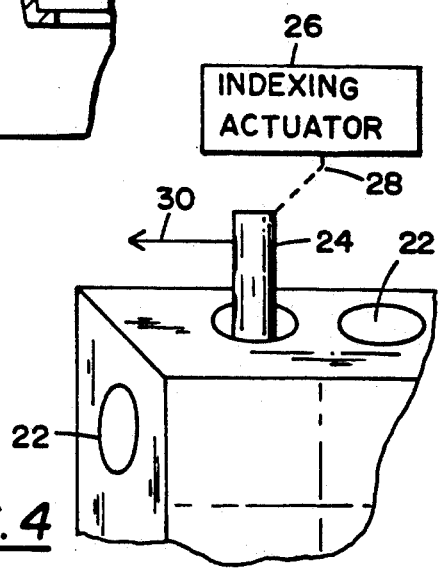
FIG. 4 is a functional diagram showing how the holes in the side of the tray can be used to index the tray by the spacing from one cell to the next cell.

FIG. 4 shows functionally how the tray may be easily handled and indexed by a planting machine. An indexing member 24 is inserted into a hole 22 by an indexing actuator 26, operating through a suitable mechanical connection shown as a dashed line 28 in FIG. 4. The member 24 is then advanced by the distance from one cell to the next as shown by arrow 30. The indexing member is then withdrawn, returned to the starting position, and inserted into the next hole 22. After each advance, a plunger may be directed through the drain holes 16 in the bottom of each row of cells 11 so as to eject the seedling in much the same manner as shown in the above referenced Williames patent. Since the ventilation holes 22 are spaced the same as the cells, the cells will always be in the correct position to receive the ejection plunger.

The much larger number of ventilation holes 22, 80 in a 10 by 30 array, has an additional benefit beyond making the tray more useful for machine handling. The resulting maximized air circulation in chamber 20 dries the seedling roots that grow out the drain holes 16, causing them to fall off in a self pruning process. Hence, when the seedling is ejected by a machine operated plunger, there are no roots ripped off because they are wrapped about the bottom 14 of the cells 11.

Figure 3:
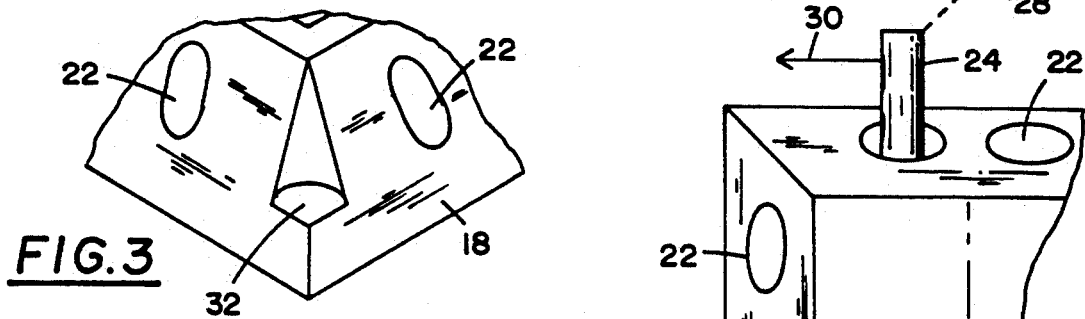
FIG. 3 is a perspective view of the corner indentation of the tray to better show the shape thereof.

FIGS. 1 and 3 show how the tray 10 has an indentation 32 molded into each corner. Indentation 32 is spaced relative to indexing holes 22 such that when two trays are adjacent to each other, and moving through the planting machine, the indentation 32 from one tray cooperates with the indentation 32 in the adjacent tray to form an opening into which the indexing member 24 can be inserted by actuator 26. Thus, the corner indentations 32 cooperate to form an indexing hole at the proper spacing corresponding to the cell spacing as the planting machine finishes with one tray and starts on another.

Other variations in the shape of the tray may be made that do not depart from the spirit and scope of the invention. Therefore limitation should be in accordance only with the appended claims and their equivalents.

I claim:

1. A seedling tray suitable for handling by machine comprising:

a plurality of germination cells arranged in an array, each cell having an open top, depending side walls, a generally flat bottom, and a hole in the cell bottom to allow drainage and ejection of the cell contents, said germination cells adapted to directly contain a growth medium and seeds as said cell contents;

a perimeter side wall about the perimeter of said array that extends down farther than the cell side walls so as to form an air circulation chamber beneath the array of cells, which chamber extends continuously from one perimeter side wall to the other;

indexing holes in said perimeter side wall, spaced from each other by the same distance that the cells are spaced from each other so that advancing the indexing holes by one hole also advances the cells by one cell, said indexing holes shaped to cooperate with an indexing member inserted therein so as to slide sideways across the array of cells, said indexing holes communicating with said air circulation chamber so as to admit ventilating air into the chamber.

2. The tray of claim 1 including indentations in the perimeter side wall at the corners of the array, said indentations spaced to cooperate with indentations in a adjacent tray to form another indexing hole.

* * * * *